US008699174B2

United States Patent
Kinney et al.

(10) Patent No.: US 8,699,174 B2
(45) Date of Patent: Apr. 15, 2014

(54) CONTROL SYSTEM FOR TAPE DRIVE TO COMPENSATE FOR SYSTEM DISTURBANCES WITHOUT USE OF FEED-FORWARD SENSOR

(75) Inventors: Charles E. Kinney, San Diego, CA (US); Ming-Chih Weng, Los Angeles, CA (US)

(73) Assignee: Quantum Corporation, San Jose, CA (US)

( * ) Notice: Subject to any disclaimer, the term of this patent is extended or adjusted under 35 U.S.C. 154(b) by 274 days.

(21) Appl. No.: 13/220,391

(22) Filed: Aug. 29, 2011

(65) Prior Publication Data

US 2013/0050868 A1 Feb. 28, 2013

(51) Int. Cl.
*G11B 5/584* (2006.01)

(52) U.S. Cl.
USPC ........................................... 360/77.12

(58) Field of Classification Search
None
See application file for complete search history.

(56) References Cited

U.S. PATENT DOCUMENTS

| | | | | |
|---|---|---|---|---|
| 4,031,369 | A * | 6/1977 | Heaman et al. | 700/189 |
| 4,935,827 | A * | 6/1990 | Oldershaw et al. | 360/77.16 |
| 5,212,388 | A * | 5/1993 | Izraelev | 250/559.1 |
| 5,293,565 | A * | 3/1994 | Jaquette et al. | 369/275.3 |
| 5,357,421 | A * | 10/1994 | Tautz et al. | 700/4 |
| 5,610,843 | A * | 3/1997 | Chou | 702/109 |
| 6,553,337 | B1 * | 4/2003 | Lounsbery | 703/2 |
| 6,574,065 | B1 * | 6/2003 | Sri-Jayantha et al. | 360/75 |
| 7,529,054 | B2 * | 5/2009 | Pang et al. | 360/75 |
| 2002/0131195 | A1 * | 9/2002 | Dehnert | 360/78.07 |
| 2004/0120069 | A1 * | 6/2004 | Kitazaki et al. | 360/75 |
| 2005/0075740 | A1 * | 4/2005 | Gao et al. | 700/78 |
| 2007/0041115 | A1 * | 2/2007 | Lee | 360/31 |
| 2009/0206190 | A1 * | 8/2009 | Bui et al. | 242/390.9 |
| 2010/0226039 | A1 * | 9/2010 | Bui et al. | 360/77.12 |
| 2011/0043945 | A1 * | 2/2011 | Cherubini et al. | 360/77.12 |
| 2013/0050868 | A1 * | 2/2013 | Kinney et al. | 360/75 |
| 2013/0100554 | A1 * | 4/2013 | Biskeborn et al. | 360/75 |

OTHER PUBLICATIONS

I.D. Landau, A. Constantinescu, and D. Rey. Adaptive narrowband disturbance rejection applied to an active suspension—an internal model principle approach. Automatica, 41(4):563-574, Jan. 2005.
T. Tay, I. Mareels, and J.B. Moore. High Performance Control. Birkhauser, Boston, 1998.

* cited by examiner

*Primary Examiner* — Peter Vincent Agustin
(74) *Attorney, Agent, or Firm* — Roeder & Broder LLP; James P. Broder

(57) ABSTRACT

A tape drive (232) that receives a tape cartridge (42) having a tape (256) comprises a tape head (280) and a control system (270). The tape head (280) transfers data between the tape drive (232) and the tape (256). The control system (270) utilizes linear parameterization to control the position of the tape head (280) relative to the tape (256). The control system (270) can include a compensator (J) and a filter (Q). The compensator (J) is a combination of the information contained in a nominal control system (370A) and the information contained in a model of the servo system (370B). The model of the servo system (370B) estimates system disturbances that affect the tracking ability of the control system (270). The filter (Q) filters the estimated system disturbances to generate a filtered system disturbance signal. The filtered system disturbance signal is then used to adjust the output of the compensator (J). Additionally, the control system (270) can utilize Youla-Kucera parameterization to control the position of the tape head (280) relative to the tape (256). Further, the control system (270) controls the position of the tape head (280) relative to the tape (256) without the use of a feed-forward sensor.

21 Claims, 3 Drawing Sheets

CONTROL SYSTEM FOR TAPE DRIVE TO COMPENSATE FOR SYSTEM DISTURBANCES WITHOUT USE OF FEED-FORWARD SENSOR

BACKGROUND

Linear tape drive systems provide for high-density recording on multiple tracks of a magnetic storage tape. In certain arrangements, parallel tracks extend along a longitudinal direction of the tape. During recording or playback, the read/write elements of the head should be aligned with the desired track as the tape moves in a longitudinal direction across the head. Closed loop positioners are often used in tape systems having higher track densities. In high-density tape systems, the tape may wander in the lateral direction (perpendicular to the longitudinal direction) as it moves in the longitudinal direction across the head, which can result in a positioning error or offset between the head and a center line of the desired track. Moreover, if the positioning error or offset is sufficiently large, it can further result in a track misregistration (TMR) error.

To avoid these types of problems, tape cartridges for high-density tape drives are preformatted with what is known as servo information, which is used to maintain the correct lateral position of the tape with respect to the read/write head. Servo information provides the system with feedback that is used to continuously position the head relative to the tape. Analysis of the servo signals such as a position error signal ("PES") allows for a determination of an offset and the distance of the offset between the track and the head. Based on the PES, the head is moved by a positioner in the lateral direction to the center line of the track so that write/read operations can occur properly.

Linear Tape Open ("LTO") is a computer storage magnetic tape format that employs a servo-based, closed loop control mechanism. The LTO roadmap calls for successive increases in capacity and speed, requiring increased track densities. As track densities increase with each new generation of LTO tape cartridges, the ability to precisely control the read/write head relative to the magnetic tape becomes increasingly important and more difficult. External vibrations (also sometimes referred to herein as "system disturbances") degrade the performance of LTO drives by causing a misalignment of the head that increases the PES, thus degrading the ability of the head to follow the desired track. If the tracking performance degrades too far then a TMR error can occur causing the drive to stop reading or writing.

Because external vibrations are present in most non-sterile conditions (due to fans, hard drives, and other rotating systems), it is imperative to compensate for such external vibrations to decrease the likelihood and/or extent of TMR. Previous technology uses an additional sensor such as an accelerometer to measure the external vibrations and feed forward the signal, possibly through a filter, to control the position of the head. Unfortunately, such technology has certain limitations. A critical element of this previous technology is the ability to measure the external vibrations ahead (in time) of when they affect the position of the head. Due to imperfections in the sensor, additional filtering is required in order to increase accuracy. As a result, incorporating a sensor into the system can increase the overall complexity of the drive.

SUMMARY

The present invention is directed toward a tape drive that receives a tape cartridge having a tape. In certain embodiments, the tape drive comprises a tape head and a control system. The tape head transfers data between the tape drive and the tape. The control system utilizes linear parameterization to control the position of the tape head relative to the tape.

In some embodiments, the control system includes a compensator and a filter. The compensator can be a combination of the information contained in a nominal control system and the information contained in a model of the servo system. Additionally, the model of the servo system estimates system disturbances that affect the tracking ability of the control system. Further, the filter filters the estimated system disturbances to generate a filtered system disturbance signal. The filtered system disturbance signal is then used to adjust the output of the compensator. Moreover, in certain embodiments, the filter can be updated to improve the performance of the compensator. For example, in one such embodiment, the filter is updated utilizing one of least mean squares filtering and recursive least squares filtering.

Additionally, in one embodiment, the control system utilizes Youla-Kucera parameterization to control the position of the tape head relative to the tape.

Further, in one embodiment, the control system controls the position of the tape head relative to the tape without the use of a feed-forward sensor.

The present invention is further directed toward a media library including a library housing, and the tape drive, as described above, positioned within the library housing.

Additionally, the present invention is further directed toward a combination including a tape cartridge and the tape drive, as described above, that receives the tape cartridge.

Further, the present invention is also directed toward a method for compensating for system disturbances in a tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Figure 1:
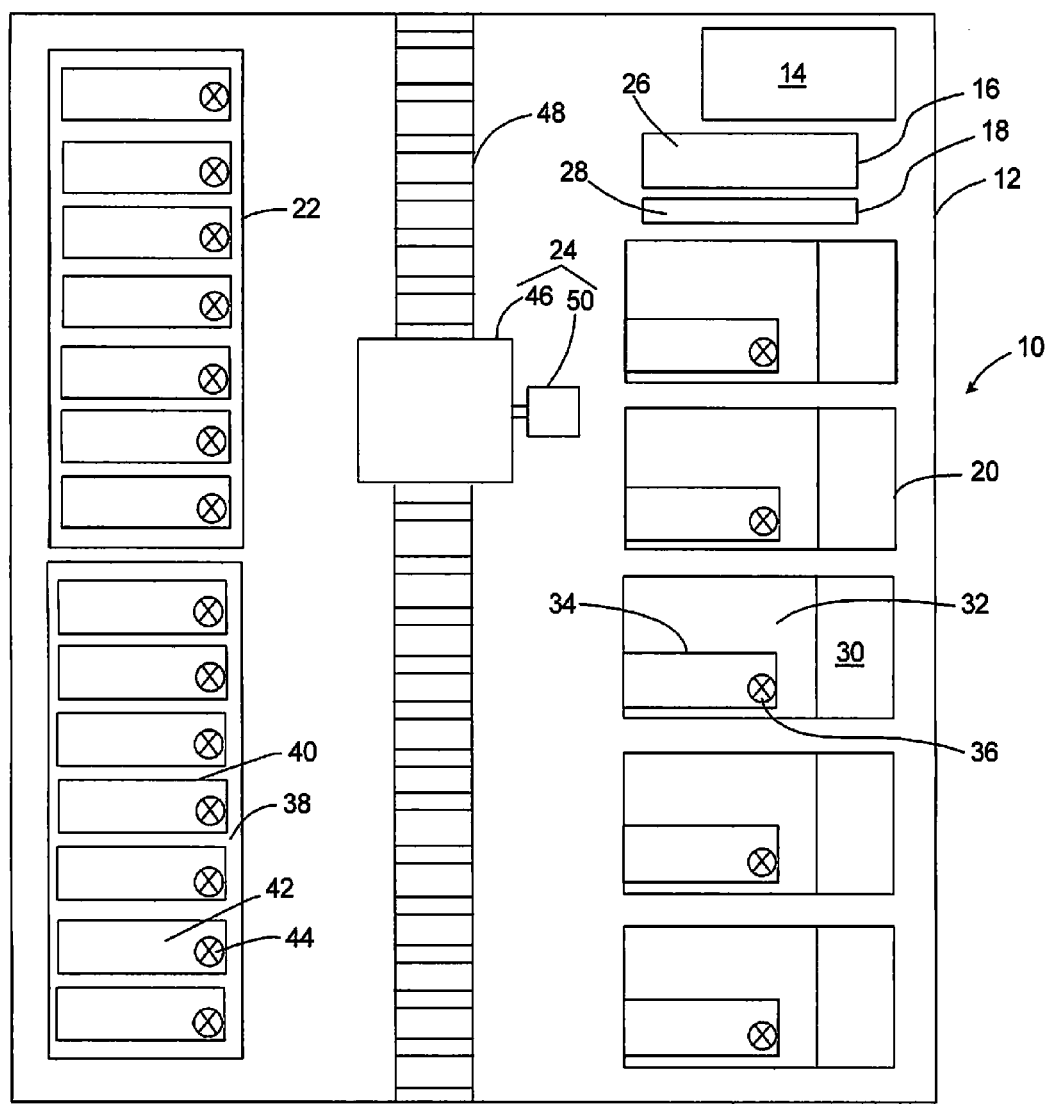
FIG. 1 is a simplified block diagram of one embodiment of a media library, including a data transfer device having features of the present invention.

FIG. 1 is a simplified block diagram of one embodiment of a media library 10 having features of the present invention. It should be noted that the media library 10 illustrated in FIG. 1 is just one non-exclusive example of a media library usable with the present invention, and no limitations are intended based on the specific type and/or size of the media library shown in FIG. 1. Additionally, although the media library 10 shown and described relative to FIG. 1 is specifically referred to and described at times as a tape cartridge library or tape library, it is understood that the present invention is equally applicable for use with any other suitable types of libraries using other types of storage media, such as optical disks, magnetic disk drives, emulated tape drives, etc., as non-exclusive examples.

In one embodiment, the media library 10 includes a library housing 12 (also sometimes referred to herein simply as a "housing"), a power supply 14, a storage media loader controller slot 16, a library controller slot 18, a plurality of data transfer assembly slots 20, one or more storage media retainer slots 22, and a storage media mover assembly 24 (also sometimes referred to herein simply as a "mover assembly").

The housing 12 may be substantially rectangular or square in cross section. Alternatively, the housing 12 can have another suitable shape or configuration. For example, the housing 12 can have a substantially circular cross-sectional shape. Additionally, the housing 12 may be constructed of any number of conventional materials such as, for example, those utilized in industry standard rack mount cabinets.

The power supply 14 provides electrical power in a well known manner to the storage media loader controller slot 16, the library controller slot 18, the plurality of data transfer assembly slots 20, and the storage media mover assembly 24. The power supply 14 is interfaced with these components as well as with an external power source in a well known manner using industry standard cabling and connections.

The storage media loader controller slot 16 receives a storage media loader controller 26. Additionally, the library controller slot 18 receives a library controller 28. The storage media loader controller 26 and the library controller 28 can have any suitable design, many of which are well known in the industry.

In alternative embodiments, the media library 10 can have any suitable number of data transfer assembly slots 20, which may differ from that shown in FIG. 1. Additionally, in one embodiment, each of the data transfer assembly slots 20 receives a data transfer assembly 30. Further, as provided herein, each data transfer assembly 30 can include a data transfer device 32, such as a tape drive, although the data transfer device 32 can include other suitable devices adapted for use with different types of storage media, such as optical drives, hard disk drives, etc. The data transfer assemblies 30 within the media library 10 can be substantially identical to one another. Alternatively, one or more of the data transfer assemblies 30 within the media library 10 can be different from the remaining data transfer assemblies 30 in the media library 10.

Each data transfer device 32 includes a storage media slot 34 and a corresponding storage media sensor 36 positioned within the storage media slot 34 which generates a storage media presence signal.

In alternative embodiments, the media library 10 can have any suitable number of storage media retainer slots 22, which may differ from that shown in FIG. 1. Additionally, each of the storage media retainer slots 22 can receive a standard storage media retainer 38, which includes a plurality of storage media slots 40. Each storage media slot 40 can receive a storage media cartridge 42, e.g., a tape cartridge, (also referred to herein as "cartridge"), with each of the storage media cartridges 42 being adapted for use in the media library 10. The storage media retainer 38 can also include a storage media presence flag 44 within each storage media slot 40 which provides an indication of the presence or absence of a storage media cartridge 42.

It is recognized that many different types of mover assemblies 24 can be used in the media library 10. For example, the mover assembly 24 can include a rack and pinion system, a pulley or belt system, or some other suitable type of mover assembly 24.

As shown in FIG. 1, the mover assembly 24 can include a storage media mover 46 (also sometimes referred to herein simply as a "mover") that moves along a mover rack 48, and a mover motor 50.

In the embodiment illustrated in FIG. 1, the storage media mover 46 is positioned within the housing 12 along the mover rack 48 between the one or more first data transfer assembly slots 20 and the one or more storage media retainer slots 22. In this manner, the storage media mover 46 is able to load and unload storage media cartridges 42 to and from all of the data transfer devices 32 and the storage media retainers 38 within the media library 10.

During use, upon receiving a signal from the storage media loader controller 26 and/or the library controller 28 to access a certain storage media cartridge 42, the mover motor 50 drives the storage media mover 46 so that it moves translationally along the mover rack 48 to the appropriate position to access the requested storage media cartridge 42.

Figure 2:
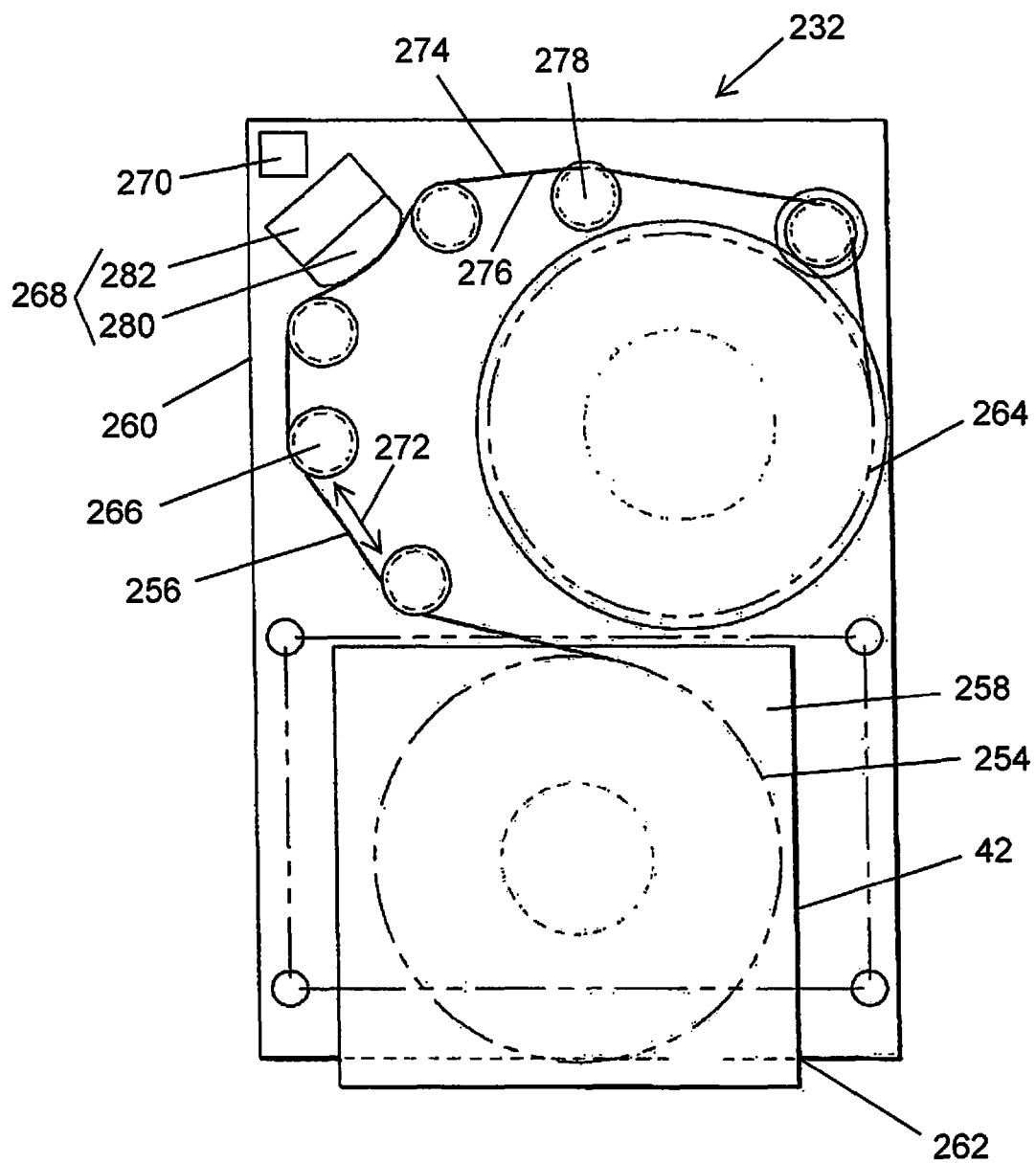
FIG. 2 is a simplified top view of one embodiment of the storage media cartridge and a portion of one embodiment of the data transfer device illustrated in FIG. 1, including a control system having features of the present invention.

FIG. 2 is a simplified top view of one embodiment of the storage media cartridge 42, or tape cartridge, and a portion of one embodiment of the data transfer device 232, or tape drive, which in one embodiment, can be substantially similar to that illustrated in FIG. 1.

The design, size and shape of the storage media cartridge 42 can be varied. For example, in one non-exclusive embodiment, the storage media cartridge 42 can be a tape cartridge, such as an LTO tape cartridge. In the embodiment illustrated in FIG. 2, the cartridge 42 includes a cartridge reel 254, a storage tape 256 (sometimes referred to herein as "tape") and a substantially rectangular cartridge housing 258 that encloses the cartridge reel 254 and the tape 256. In a typical cartridge 42, the tape 256 is positioned on the cartridge reel 254. The tape 256 stores data in a form so that the data can be subsequently retrieved.

The design of the tape drive 232 can vary. In one embodiment, the tape drive 232 includes a drive housing 260, a cartridge receiver 262 (illustrated with dashed lines), a take-up reel 264, a guide assembly 266, a head assembly 268, and a control system 270. In certain embodiments, the tape drive 232 may further include a cover, but the cover has not been included in FIG. 2 for purposes of clarity.

The drive housing 260 retains the various components of the tape drive 232. The drive housing 260 generally houses and/or surrounds the components within the tape drive 232.

The cartridge receiver 262 receives the cartridge 42. In particular, during use, a robotic picker mechanism or a human operator inserts the cartridge 42 into the cartridge receiver 262 of the tape drive 232. Upon insertion of the cartridge 42 into the tape drive 232, the tape 256 moves along a tape path 272 (as illustrated by arrow) between the cartridge reel 254 of the cartridge 42 and the take-up reel 264 of the tape drive 232, and past the head assembly 268.

The tape 256 includes a first side 274 and an opposing second side 276. In one embodiment, one of the sides 274, 276 stores the data. In the embodiment illustrated in FIG. 2, the first side 274 directly faces and contacts the head assembly 256. Thus, in this embodiment, the first side 274 is configured to store data. It is recognized that in other embodiments, the second side 276 can additionally or alternatively be adapted to store data.

The guide assembly 266 guides the tape 256 along the tape path 272 past the head assembly 268 and onto the take-up reel 264. The guide assembly 266 can inhibit lateral tape motion during operation of the tape drive 232. In one embodiment, all or some of the guide assembly 266 is coupled or directly secured to the drive housing 260.

In one embodiment, the guide assembly 266 includes one or more tape rollers 278 (sometimes referred to herein as "rollers") that guide the tape 256 between the cartridge reel 254 and the take-up reel 264 and past the head assembly 268. In the embodiment illustrated in FIG. 2, the guide assembly 266 includes six rollers 278, although the number of rollers 278 can be varied to suit the design requirements of the tape drive 232. Additionally, each of the rollers 278 can be rotatable, or one or more of the rollers 278 can be fixed.

The head assembly 268 is coupled or directly secured to the drive housing 260. In one embodiment, the head assembly 268 includes (i) a tape head 280 that reads data from and writes data to the tape 256; and (ii) a mover assembly 282 that moves the tape head 280 in a direction that is approximately perpendicular to the direction of movement of the tape 256 along the tape path 272, i.e. in and out of the page in FIG. 2. With this design, the position of the tape head 280 can be adjusted for slight variations in the position of the tape 256 when the tape 256 moves along the tape path 272 across the tape head 280.

The mover assembly 282 positions the tape head 280 relative to the tape 256. The design of the mover assembly 282 can be varied to suit the design requirements of the tape drive 232. In one embodiment, the mover assembly 282 can include a first mover (not illustrated) that provides coarse positioning of the tape head 280 and a second mover (not illustrated) that provides fine positioning of the tape head 280. Alternatively, the mover assembly 282 can have a different design which may include a different number and type of movers.

The control system 270 controls movement of the mover assembly 282, and thus, the positioning of the tape head 280. In one embodiment, the control system 270 can control movement of the tape head 280 based on a positioning signal received from the tape head 280. This positioning signal is generated by the tape head 280 based on servo information located on the storage tape 256. For example, the tape head 280 can include one or more sensors (not illustrated) that sense the actual position of the tape head 280 relative to the tape 256 versus the desired position of the tape head 280 relative to the tape 256 based on servo information located on the storage tape 256. The tape head 280 transmits the positioning signal to the control system 270. Based on the positioning signal, the control system 270 controls movement of the tape head 280, e.g., through use of the mover assembly 282, to maintain and/or adjust, as necessary, the lateral position of the tape head 280 with respect to the storage tape 256. This type of closed-loop system provides continuous feedback to the control system 270 to determine and/or correct the position of the tape head 280 relative to the storage tape 256.

In addition to utilizing the positioning signal to control movement of the tape head 280, the control system 270 further utilizes linear parameterization, e.g., Youla-Kucera parameterization (sometimes referred to as "Q-parameterization"), to compensate for vibrations and other disturbances that may otherwise cause the tape head 280 to be improperly positioned relative to the tape 256. As utilized herein, vibrations and other disturbances can be referred to collectively as "system disturbances". With this design, the present invention does not require an additional sensor, i.e. a feed-forward sensor, as has been utilized in previous attempts to address the issue of such system disturbances potentially causing TMR errors, and thus, does not require feed-forward-based control. Through use of linear parameterization, such as Youla-Kucera parameterization, as discussed in greater detail below, the present invention is able to adjust the control system 270, and thus the control of the position of the tape head 280, automatically (adaptively) to improve the performance of the tape drive 232 during vibration or while other disturbances may be present. System disturbances may be caused by the mover assembly 282, the tape roller 278, or various other features included within the tape drive 232, the media library 10 (illustrated in FIG. 1) and/or the surrounding environment.

Figure 3:
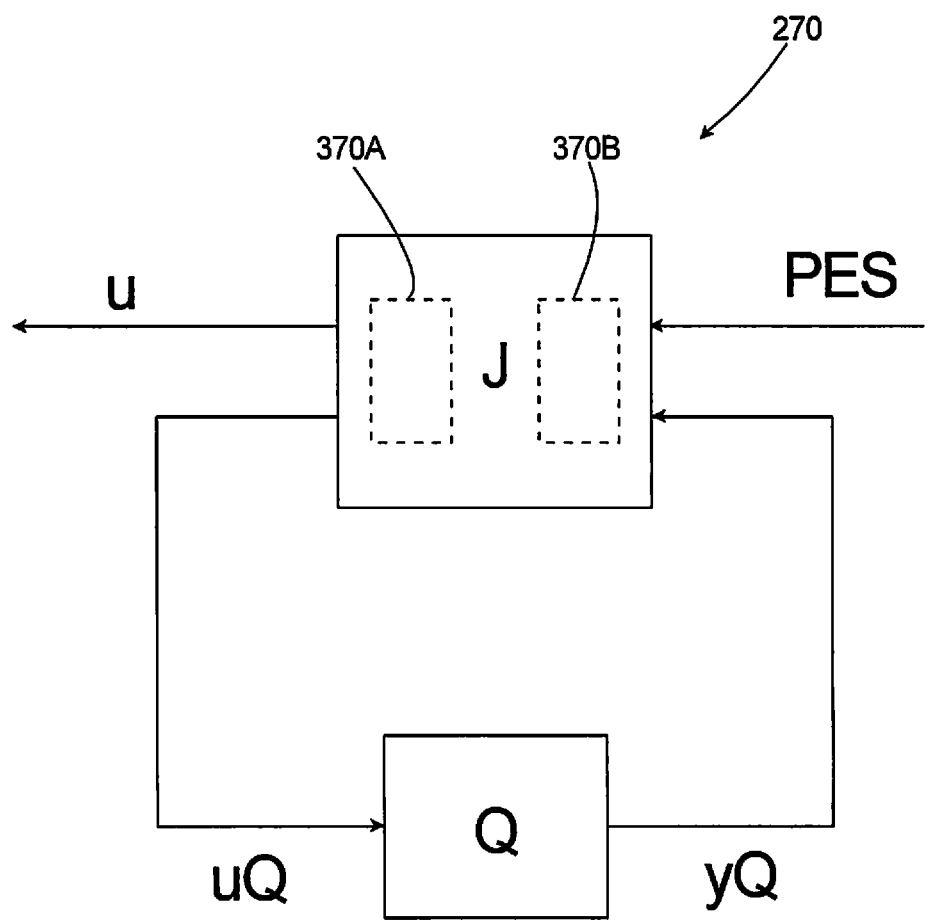
FIG. 3 is a simplified block diagram of one embodiment of the control system illustrated in FIG. 2.

FIG. 3 is a simplified block diagram of one embodiment of the control system 270 illustrated in FIG. 2. In particular, FIG. 3 illustrates the application of the Youla-Kucera parameterization as utilized within the control system 270. In control theory, the Youla-Kucera parametrization is a formula that describes the set of all possible stabilizing feedback controllers for a given system, as a function of a single filter.

The precise design of the control system 270 can be varied. As illustrated in FIG. 3, the control system 270 includes a compensator, J, and a filter, Q, that adaptively updates the compensator J. As described herein, the control system 270 can be described as an adaptive feedback controller. Advantages of this method, i.e. this control system 270, to control the positioning of the tape head 280 (illustrated in FIG. 2) relative to the storage tape 256 (illustrated in FIG. 2), can include that the likelihood of feedback stability is greatly increased, if not guaranteed, and this method is computationally similar to existing servo compensators, making this method practical and computationally efficient to use.

The compensator J compensates for position error that is due to the normal operation of the tape drive 232 (illustrated in FIG. 2). The compensator J further compensates for any external vibrations and/or other disturbances, i.e. the system disturbances, which may otherwise impact the performance of the tape drive 232. In this embodiment, the compensator J effectively combines the information contained in a nominal control system 370A (illustrated in phantom in FIG. 3) and the information contained in a model of the servo system 370B (illustrated in phantom in FIG. 3). More particularly, the control system 270 utilizes the model of the servo system 370B to estimate the system disturbances that affect the tracking ability of the control system 270. The estimated system disturbances are then used to update the compensator J in an intelligent manner that improves performance and increases the likelihood of, if not guarantees, feedback stability. In one embodiment, the control system 270 can increase the likelihood of feedback stability even in the presence of modeling errors within the model of the servo system 370B.

Additionally, in alternative embodiments, the compensator J can replace an existing control system, e.g., a control system that simply utilizes a nominal controller, or can be simply added onto and/or used in combination with the existing (nominal) control system.

As utilized herein, the nominal controller 370A, which is designed to achieve proper tracking performance and stability when external disturbances are not present, can be represented by Cx; wherein $Cx = NcDc^{-1}$. In this equation, both Nc and Dc are right coprime. Additionally, the model of the servo system 370B, which is used to estimate the system disturbances that affect the tracking ability of the control system 270, can be represented by Gx; wherein $Gx=NxDx^{-1}$. In this equation, both Nx and Dx are also right coprime.

Thus, the function of the compensator J can be described by the following equation:

$$J = \begin{pmatrix} Cx & Nx + CxDx \\ Dc^{-1} & Dc^{-1}Nx \end{pmatrix} \quad \text{(Equation 1)}$$

When used as an add-on to an existing nominal controller, then Cx=0 and Gx is a model of the whole tracking system that is comprised of the mover assembly 282 and the existing nominal controller.

Referring back to FIG. 3, the position error signal (PES) is input into the compensator J of the control system 270. As stated above, the nominal controller 370A portion of the compensator J achieves proper tracking performance and stability when external disturbances are not present. The estimated system disturbance signal that the nominal controller 370A cannot remove is denoted by uQ, which is directed to the filter Q. The filtered system disturbance signal, which is then used to adjust, update and/or modify the compensator J, is denoted by yQ.

During use, the filter Q is adjusted to improve the performance of the compensator J, and thus the control system 270 as a whole. When Q=0, the overall adaptive compensator, as illustrated in FIG. 3, reduces to Cx. Thus, the filter Q is use to adaptively update the compensator J so that the compensator J can effectively compensate for external vibrations and/or disturbances, i.e. the system disturbances.

Thus, the new control system 270 can be represented by the following equation:

$$CQ=(Nc+DxQ)(Dc-NxQ)^{-1}, \quad \text{(Equation 2)}$$

which is known as the Youla-Kucera parametrization or Q-parametrization from control theory. Subsequently, the output of the control system, as shown in FIG. 3, is denoted by u. Similarly, in add-on mode, when Q=0 then only the existing nominal controller is used for tracking. In an alternative embodiment, additional filtering of the disturbance can be utilized, such as a band pass filter or another suitable type of filter.

Thus, the filter Q can be updated online or adaptively to remove external disturbances, and as a result no feed-forward sensor is needed to compensate for system disturbances in the tape drive 232. The Q-parameter is updated by searching for a filter that improves PES performance. This filter improves the PES signal which in turn will decrease the number and/or extent of TMRs. Moreover, by property of the Q-parameterization, the filter Q will always produce a controller that stabilizes the feedback system.

In different embodiments, various methods can be used to update the filter Q. For example, the filter Q can be updated through use of least mean squares filtering, recursive least squares filtering, or any other method that drives the error signal towards zero. Additionally, bounding and filtering the parameters of the filter Q can be shown to be beneficial in the presence of modeling errors by increasing the likelihood that the parameters do not get too large and change relatively slowly with time.

The control system 270 and method, as described herein, functions as a robust, reliable, and effective technique to decrease the effect of, cancel, or otherwise account for system disturbances to the tape drive 232 and thus to improve the overall tracking performance of the tape drive 232.

While a number of exemplary aspects and embodiments of a media library 10, data transfer device 32 and various methods have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape drive that receives a tape cartridge having a tape, the tape drive comprising:
    a tape head that transfers data between the tape drive and the tape; and
    a control system that utilizes linear parameterization to control the position of the tape head relative to the tape, the control system including a compensator and a filter, wherein the compensator is a combination of the information contained in a nominal control system and the information contained in a model of a servo system.

2. The tape drive of claim 1 wherein the model of the servo system estimates system disturbances that affect the tracking ability of the control system.

3. The tape drive of claim 1 wherein the filter filters the estimated system disturbances to generate a filtered system disturbance signal, and wherein the filtered system disturbance signal is used to adjust the output of the compensator.

4. The tape drive of claim 1 wherein the filter can be updated to improve the performance of the compensator.

5. The tape drive of claim 4 wherein the filter is updated utilizing one of least mean squares filtering and recursive least squares filtering.

6. A tape drive that receives a tape cartridge having a tape, the tape drive comprising:
    a tape head that transfers data between the tape drive and the tape; and
    a control system that utilizes Youla-Kucera parameterization to control the position of the tape head relative to the tape.

7. The tape drive of claim 6 wherein the control system compensates for system disturbances without the use of a feed-forward sensor.

8. A media library including a library housing, and the tape drive of claim 6 positioned within the library housing.

9. A combination including a tape cartridge and the tape drive of claim 6 that receives the tape cartridge.

10. A tape drive that receives a tape cartridge having a tape, the tape drive comprising:
    a tape head that transfers data between the tape drive and the tape; and
    a control system that controls the position of the tape head relative to the tape, the control system including (i) a compensator that is a combination of the information contained in a nominal control system and the information contained in a model of a servo system, the model of the servo system being utilized to estimate system disturbances that affect the tracking ability of the control system; and (ii) a filter that filters the estimated system disturbances to generate a filtered system disturbance signal that is used to adjust the output of the compensator, the control system utilizing Youla-Kucera parameterization to control the position of the tape head relative to the tape.

11. A method for compensating for system disturbances in a tape drive, the method comprising the step of:

controlling the position of a tape head relative to a tape with a control system that utilizes linear parameterization, the control system having a compensator and a filter, the compensator being a combination of the information contained in a nominal control system and the information contained in a model of a servo system; and estimating the system disturbances that affect the tracking ability of the control system with the model of the servo system.

12. The method of claim 11 further comprising the steps of filtering the estimated system disturbances to generate a filtered system disturbance signal with the filter, and adjusting the output of the compensator with the filtered system disturbance signal.

13. The method of claim 12 further comprising the step of updating the filter to improve the performance of the compensator.

14. The method of claim 11 wherein the step of controlling includes the control system utilizing Youla-Kucera parameterization.

15. The method of claim 11 wherein the step of controlling includes controlling the position of the tape head relative to the tape with the control system without the use of a feedforward sensor.

16. A media library including a library housing and a control system that utilizes the method of claim 11.

17. A method for compensating for system disturbances in a tape drive, the method comprising the step of:
controlling the position of a tape head relative to a tape with a control system that utilizes Youla-Kucera parameterization.

18. The method of claim 17 wherein the control system includes a compensator and a filter.

19. The method of claim 17 wherein the step of controlling includes the control system having a compensator and a filter.

20. The method of claim 19 wherein the step of controlling includes the compensator being a combination of the information contained in a nominal control system and the information contained in a model of a servo system, and further comprising the step of estimating the system disturbances that affect the tracking ability of the control system with the model of the servo system.

21. A combination including a tape cartridge and a tape drive that receives the tape cartridge, the tape drive including a control system that utilizes the method of claim 17.

* * * * *